United States Patent
Cheng et al.

(10) Patent No.: US 6,175,505 B1
(45) Date of Patent: Jan. 16, 2001

(54) DEVICE FOR RECEIVING AND CONNECTING A MEMORY CARD

(75) Inventors: Yin-Shiang Cheng, Taipei; Hsueh-Wen Sun, Taipei Hsien, both of (TW)

(73) Assignee: Acer Peripheals, Inc. (TW)

( * ) Notice: Under 35 U.S.C. 154(b), the term of this patent shall be extended for 0 days.

(21) Appl. No.: 09/074,379

(22) Filed: May 8, 1998

(30) Foreign Application Priority Data

Jul. 17, 1997 (TW) .................................. 86211974

(51) Int. Cl.[7] ........................................ H05K 1/14
(52) U.S. Cl. .................. 361/752; 361/802; 361/760; 361/737; 439/116; 439/122
(58) Field of Search .................... 361/752, 760, 361/801, 802, 810, 737, 658; 439/116, 122, 147, 326

(56) References Cited

U.S. PATENT DOCUMENTS 5,603,629 * 2/1997 DeFrasne et al. .................... 439/331
5,813,878 * 9/1998 Kuwata et al. ...................... 439/326
5,822,190 * 10/1998 Iwasaki ................................ 361/737
5,933,328 * 8/1999 Wallace et al. ..................... 361/796

* cited by examiner

*Primary Examiner*—Leo P. Picard
*Assistant Examiner*—Hung Van Duong
(74) *Attorney, Agent, or Firm*—Pillsbury Madison & Sutro LLP

(57) ABSTRACT

A rectangular recessed portion is formed on the upper surface of the transceiver of a portable telephone set for receiving a SIM card. A plurality of contacts are disposed on a base plate which is disposed under the rectangular recessed portion and above a printed circuit board of the transceiver without directly contacting the printed circuit board. The rectangular recessed portion has a plurality of slots formed on the bottom thereof. Each of the contacts protrudes from the corresponding slot of the rectangular recessed portion to couple to the electrical contacts of a SIM card, and has an extended end electrically connected to the contacts of the printed circuit. The recessed rectangular recessed portion has an inclined plane for facilitating the loading of the SIM card.

4 Claims, 7 Drawing Sheets

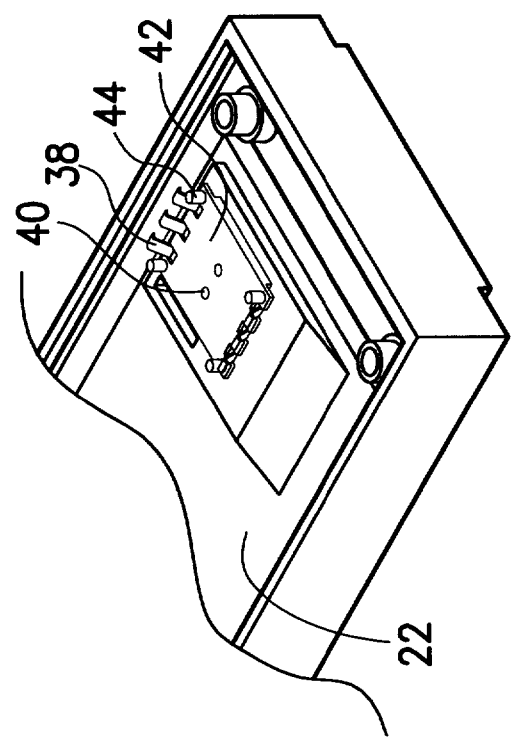
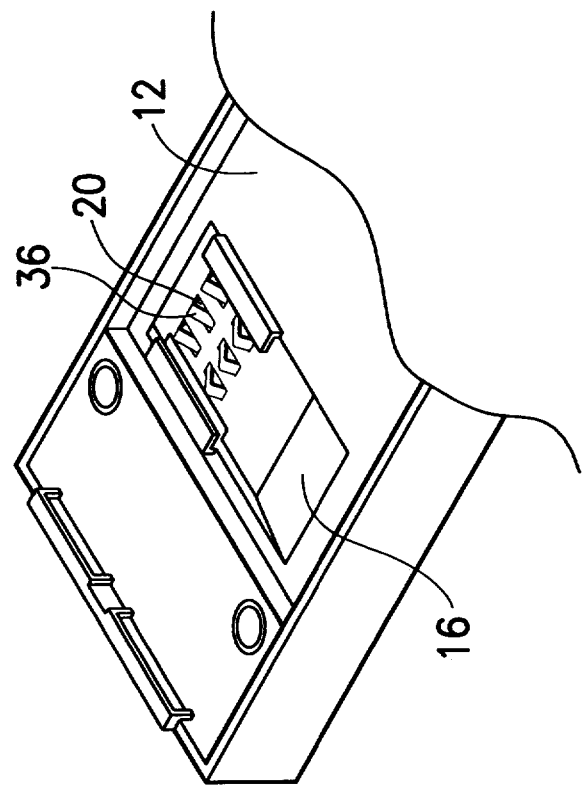
FIG. 3B
FIG. 3A

DEVICE FOR RECEIVING AND CONNECTING A MEMORY CARD

FIELD OF THE INVENTION

The present invention relates in general to a device for receiving and connecting a memory card, and in particular to a device for receiving and connecting a SIM (Subscriber Identification Module) card used in a portable telephone set.

DESCRIPTION OF THE PRIOR ART

Referring to FIG. 5, a perspective view of a portable telephone set with its user interface module removed to reveal the upper surface of the transceiver 50 is shown. A recessed portion 52 is formed on the upper surface and a cartridge-shaped card receiving case 54 is slidably mounted on the long edges of the recessed portion 52. The card receiving case 54 is so designed that it will be slid and raised in a direction indicated by the arrow when the central upper surface 51 is pressed and pushed rightward, and thus is convenient for inserting a memory card, i.e. a SIM card 53. In this design, the printed circuit board (not shown), which includes an electrical contact for connecting to the electrical contact of the SIM card 53 when it is loaded, is welded directly on the backside of the transceiver 50 corresponding to the recessed portion 52. Thus, a larger area of the printed circuit board is occupied, and loading the SIM card 53 is not convenient for users.

In FIG. 6, another design of the SIM card receiving mechanism is shown. A recessed portion 62 is also formed on the upper surface of the transceiver 60 for receiving the SIM card 63. A cover plate 64 covers the recessed card-receiving portion 62. The cover plate 64 is rotatably disposed on the edge of the recessed card-receiving portion 62. This card receiving mechanism is convenient for loading a SIM card. However, as the card receiving portion 62 is directly disposed on the printed circuit board (not shown), a larger area of the printed circuit board is also used.

SUMMARY OF THE INVENTION

It is therefore an object of the invention to provide a memory card receiving and connecting device which occupies a smaller area of the printed circuit board of the transceiver of a portable telephone set and is convenient for loading a memory card therein.

According to the invention, a rectangular chamber, which is a recessed portion, is formed on the upper surface of the transceiver and has a plurality of slots formed on the bottom thereof. A plurality of contacts are disposed on a base plate which is disposed under the rectangular chamber and above a printed circuit board of a transceiver of a portable telephone set without contacting directly with the printed circuit board. Each of the contacts protrudes from the corresponding slot of the rectangular chamber to couple to the electrical contacts of a SIM card, and has an extended end electrically connected to the contacts of the printed circuit board. The recessed rectangular chamber has an inclined plane disposed at the open short edge of the chamber.

According to an aspect of the invention, the recessed rectangular chamber also has a pair of horizontally inward flanges disposed on the long edges of the rectangular chamber to retain the memory card when it is inserted into the chamber.

According to another aspect of the invention, the base plate is supported by supporting poles on the printed circuit board in a manner the base plate is not in contact with the printed circuit board.

BRIEF DESCRIPTION OF THE DRAWINGS

The invention is hereinafter described in detail by a preferred embodiment of the invention with reference to the accompanying drawings in which:

FIG. 1b is a perspective view of the backside of the transceiver of FIG. 1a;

FIG. 3a is a perspective view showing the transceiver integrated with an assembled memory card receiving and connecting device according to the preferred embodiment of the invention;

FIG. 3b is perspective view showing the backside of the transceiver of FIG. 3a;

DETAILED DESCRIPTION OF THE PREFERRED EMBODIMENT

Figure 1B:
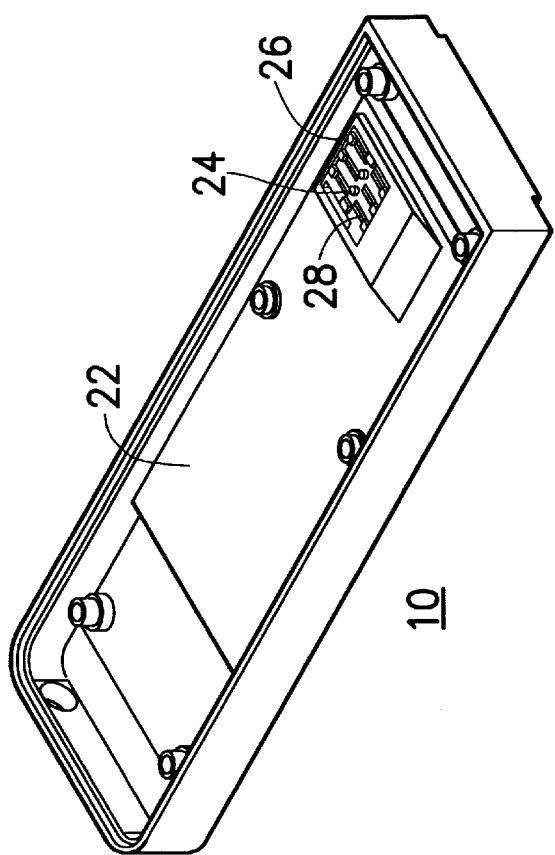
Figure 1A:
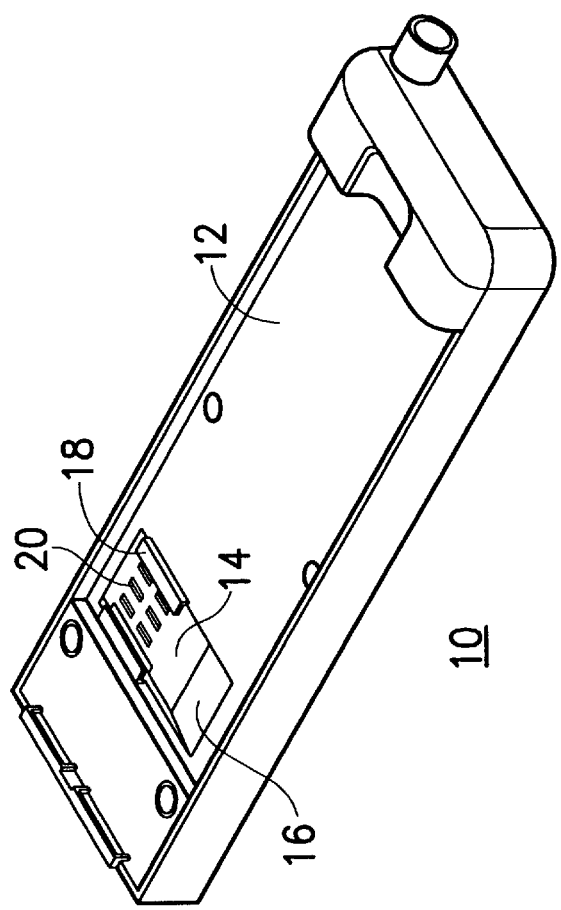
FIG. 1a is a perspective view of a portable telephone set with its user surface module removed to reveal the upper surface of the transceiver into which the receiving and connecting device is integrated.

FIG. 1a depicts a portable transceiver 10 with its user interface module removed. A recessed portion 14 is formed on the upper surface 12 of the transceiver 10. The recessed portion 14 is rectangular, and thus forms a chamber for receiving a memory card, i.e. a SIM card. The recessed portion 14 has an inclined plane 16 disposed on the short edge of the recessed portion 14 to facilitate the loading of a SIM card (not shown). On the two sides thereof, i.e. the two long edges of the recessed portion 14, a pair of horizontally inward flanges 18 are provided to retain the SIM card when it is loaded in the chamber. Six slots 20 are formed on the bottom of the recessed portion 20. The six slots 20 are arranged in three rows in a manner such that each slot 20 is in parallel with the long edge of the rectangular recessed portion 14. The six slots 20 are designed for receiving the contacts 36 disposed on an upper surface 32 of a base plate 30 to allow the contacts 36 protruding from the slot 20 to couple to the contact of a SIM card. The base plate structure is illustrated in FIG. 2a and FIG. 3c, which will be described hereinafter.

FIG. 1b depicts the backside 22 of the transceiver 10 of FIG. 1a. As can be seen from FIG. 1a, two protrusions 24 are provided on the backside of the transceiver 10, and recessed portions 28 are formed at the edges near the protrusions 24 of the slots 20.

Figure 2B:
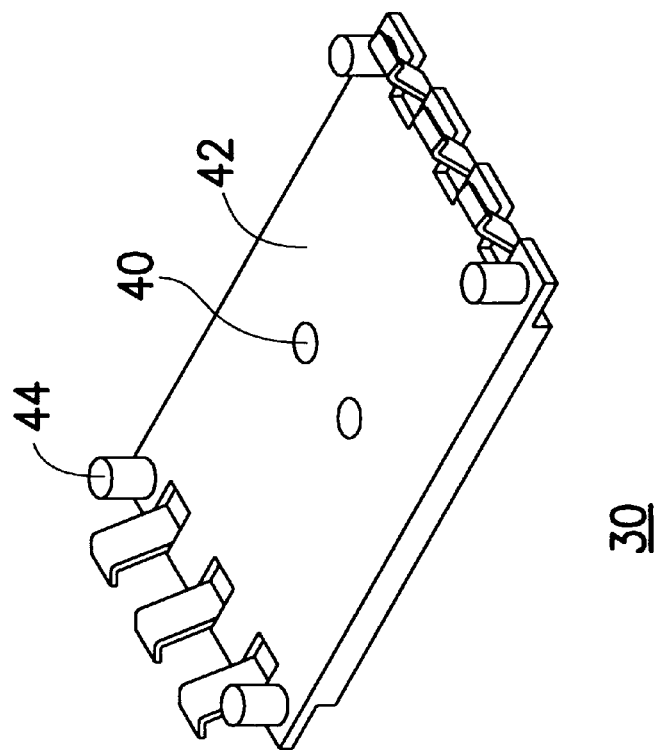
FIG. 2b is a perspective view showing the backside of the assembly of FIG. 2b.
Figure 2A:
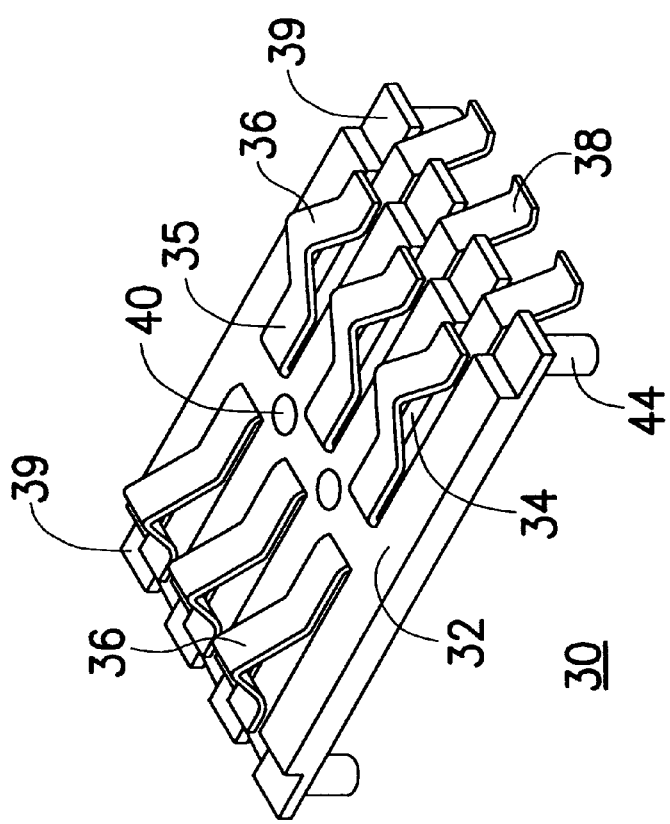
FIG. 2a is a perspective view showing an assembly of the contacts and the base plate, separated from the rectangular chamber according to the preferred embodiment of the invention.
Figure 3C:
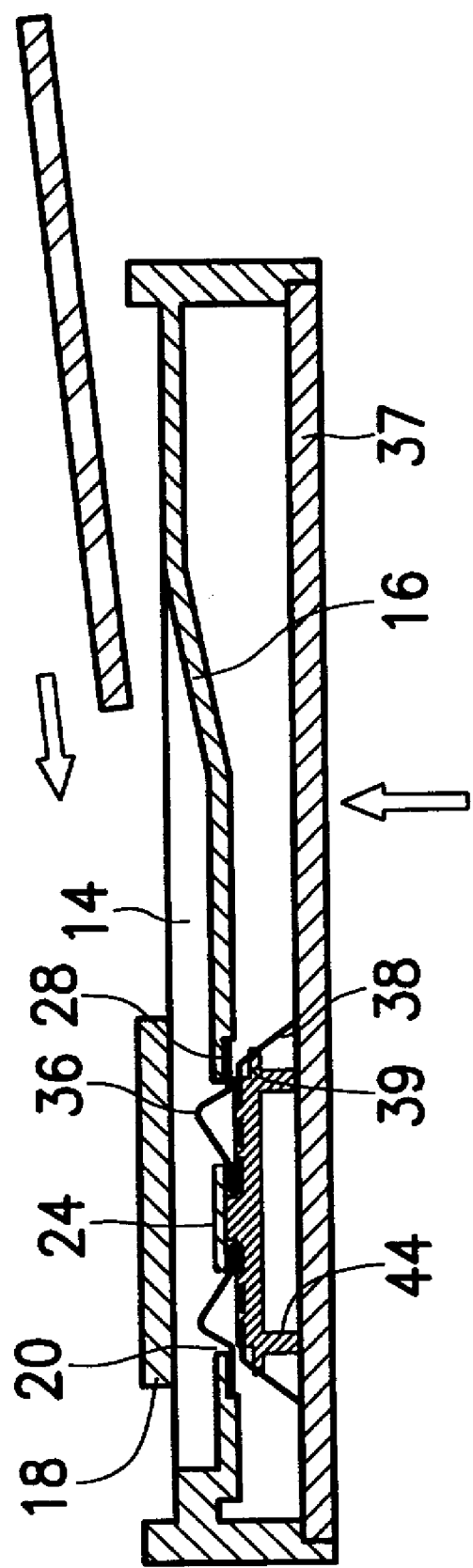
FIG. 3c is a section schematic view showing the receiving and connecting device integrated into the transceiver.

Referring to FIG. 2a, six contacts 36 are disposed on the upper surface 32 of a rectangular base plate 30 with each contact 36 being mounted on each slot 34 formed thereunder. The base plate 30 has two circular holes 40 at the centerline and its two ends 39 of the short edges have a reduced thickness. The six slots 34 are openings extended inward from the short edge of the base plate 30 and are arranged in three rows in a manner that each of the slots 34 is in parallel with the long edge of the rectangular base plate 30 and when the base plate 30 is mounted under the rectangular recessed portion 20 by receiving the circular holes 40 in the protrusions 24 and engaging the root portion of the contacts 36 with the recessed portions 28, each of the slots 34 are seated under each corresponding slot 20 formed in the bottom of the recessed portion 14. Each of the six contacts 36 consists of a metal strip and is upwardly curved while the base plate 32 is made of plastic. Each of the six contacts 36 also has a downward-extending end 38 protruding from the two short edge of the base plate 30. The downward-extending ends 38 are electrically connected to a printed circuit board (not shown) of the transceiver 10.

FIG. 2b depicts the backside of the base plate 30 with the contacts 36 mounted thereon. Four poles 44 are provided at the four corners of the bottom surface 42 of the base plate 30. The four poles 44 function as supporting means to support the base plate 30 on the printed circuit board so that the base plate 30 is not in contact with the printed circuit board directly so as to conserve the area of the printed circuit board. The four poles 44 can also reduce the jarred looseness of the base plate 30 when a SIM card is inserted into the recessed portion 20.

FIG. 3c shows a cross-sectional view of the receiving and connecting device incorporated into a transceiver. It is shown that the SIM card can be easily loaded into the recessed portion 14 due to the design of the inclined plane 16, and the fact that the base plate 30 on which contacts 36 are mounted is not in contact with the printed circuit board 37, but are supported by the poles 44. Also, the root portion of the contacts 36 of the base plate 30 can be engaged with the recessed portion 28 tightly, thereby reducing the thickness of the assembly.

Figure 4:
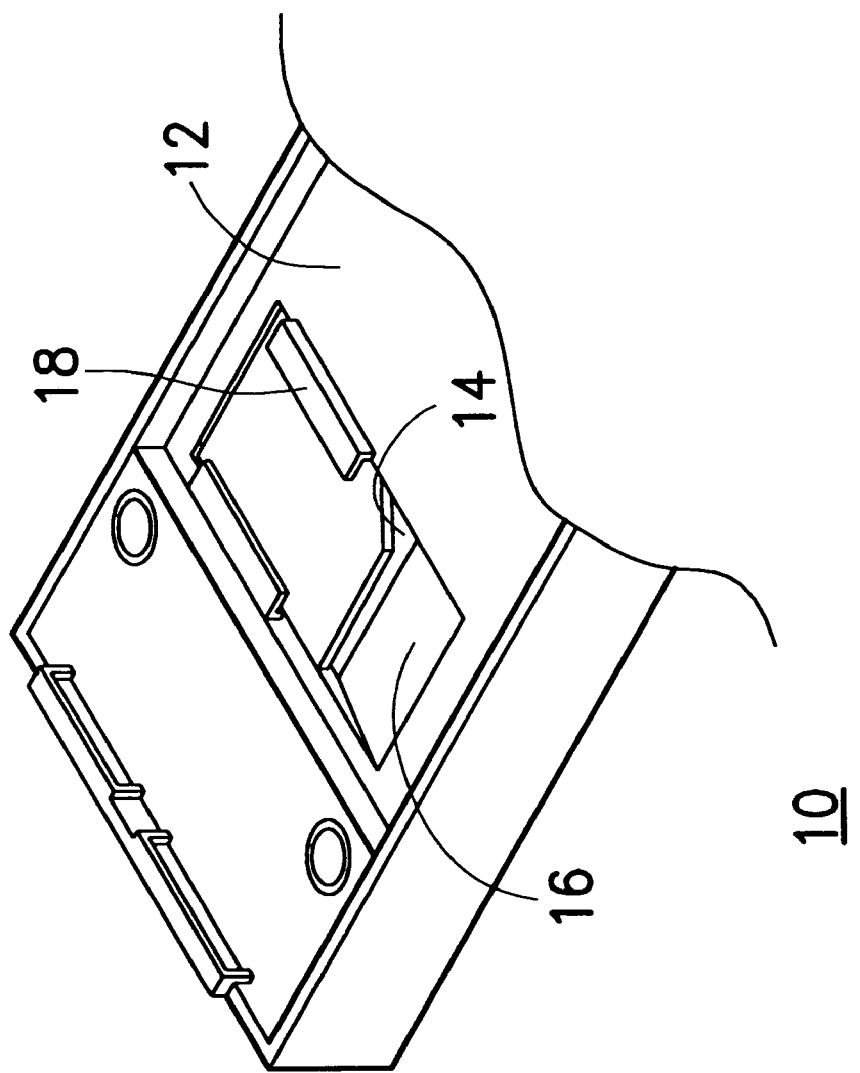
FIG. 4 is a perspective view showing a memory card loaded in the receiving and connecting device of the preferred embodiment of the invention.
Figure 5:
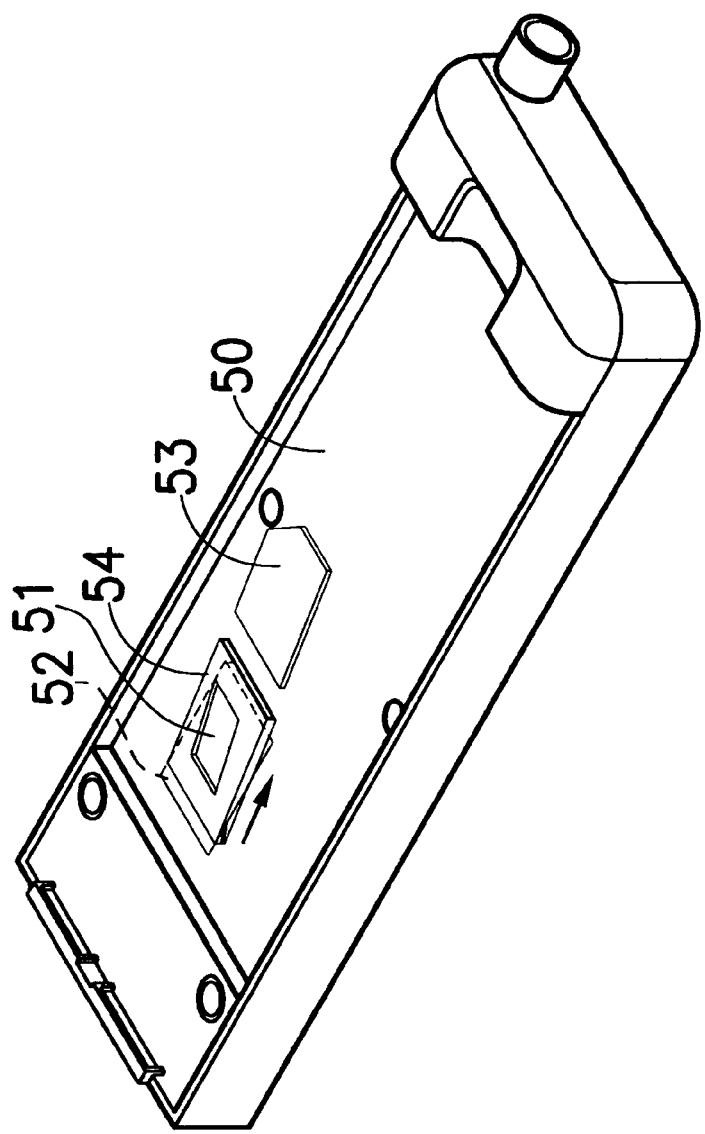
FIG. 5 is a perspective view showing a design of a conventional card receiving case integrated into a transceiver.
Figure 6:
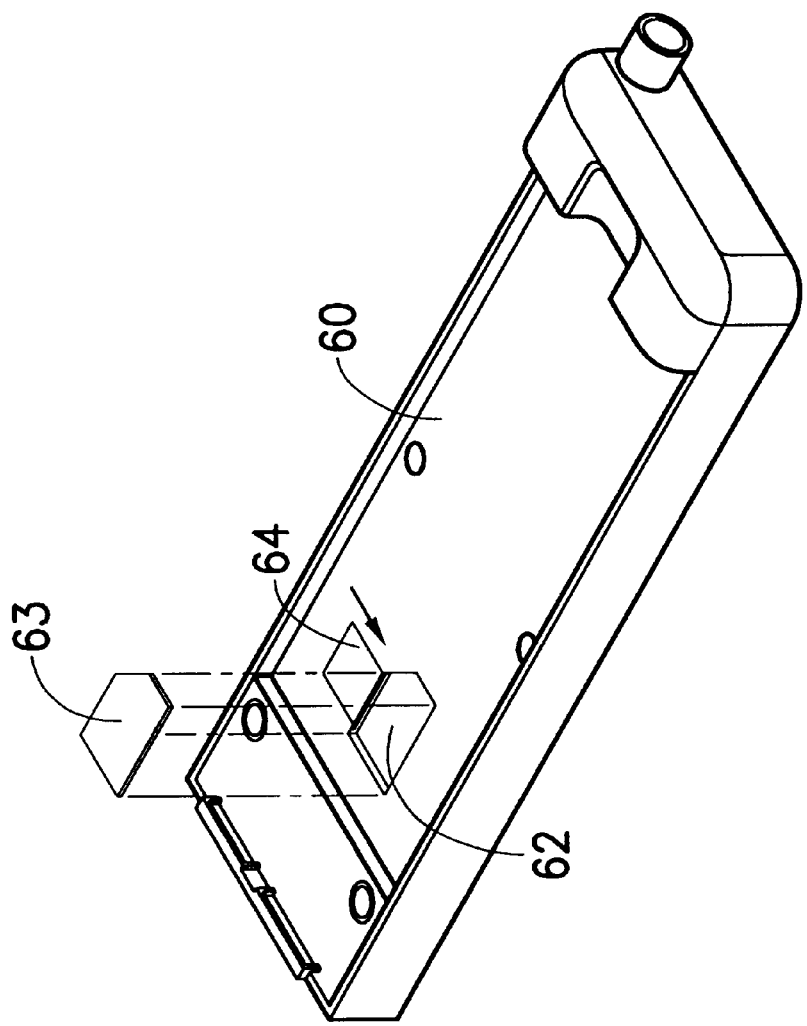
FIG. 6 is a perspective view showing another design of a conventional card receiving case integrated into a transceiver.

FIG. 3a shows the receiving and connecting device assembled and incorporated into a transceiver. FIG. 3b is a perspective view showing the backside of the transceiver of FIG. 3a. FIG. 4 is a perspective view showing a memory card loaded in the receiving and connecting device of the invention.

What is claimed is:

1. A transceiver arrangement for receiving a memory card having a plurality of first electrical contacts, and connecting the first electrical contacts to second electrical contacts respectively that are electrically coupled to a printed circuit board of the transceiver, comprising:

a rectangular chamber defined by a recessed portion of an upper surface of the transceiver, and having an inclined plane portion at a short edge of the rectangular chamber and a plurality of slots formed in the recess portion at the bottom thereof;

a base plate disposed under said rectangular chamber and above the printed circuit board, the size of the base plate being substantially the same size as the rectangular chamber; and the plurality of second contacts being disposed on said base plate in a manner such that each of said second contacts protrudes from its corresponding slot to couple to a respective first electrical contact when the memory card is received within the rectangular chamber, each second contact having an extended end electrically connected to the printed circuit board.

2. The transceiver arrangement as claimed in claim 1, wherein said recessed rectangular chamber comprises a pair of horizontally inward flanges to retain the memory card when the memory card is received in the rectangular chamber.

3. The transceiver arrangement as claimed in claim 1, wherein said base plate includes a plurality of supporting means for supporting said base plate on the printed circuit board in a manner such that said base plate is not in contact with the printed circuit board.

4. A transceiver arrangement for receiving a memory card having a plurality of first electrical contacts, and connecting the first electrical contacts to second electrical contacts, respectively that are electrically coupled to a printed circuit board of the transceiver, comprising:

a rectangular chamber defined by a recessed portion of an upper surface of the transceiver, and having an inclined plane portion at a short edge of the rectangular chamber and a plurality of slots formed in the recessed portion at the bottom thereof;

a base plate disposed under the rectangular chamber and above the printed circuit board, the base plate having an upper surface and a bottom surface, wherein a plurality of holes are formed in the upper surface for mounting the base plate, and a plurality of poles are formed on the bottom surface to support the base plate on the printed circuit board; and the plurality of second contacts being disposed on the base plate in a manner such that each of the second contacts protrudes from its corresponding slot to couple to a respective first electrical contact when the memory card is received within the rectangular chamber, each second contact having an extended end electrically connected to the printed circuit board.

\* \* \* \* \*